(12) United States Patent
Shi

(10) Patent No.: US 7,414,818 B2
(45) Date of Patent: Aug. 19, 2008

(54) RECEPTACLE TYPE GROUND-FAULT CIRCUIT INTERRUPTER

(75) Inventor: Jie Shi, Henan (CN)

(73) Assignee: Wenzhou Yongtai Electric Co., Ltd., Wenzhou (CN)

( * ) Notice: Subject to any disclaimer, the term of this patent is extended or adjusted under 35 U.S.C. 154(b) by 0 days.

(21) Appl. No.: 11/410,187

(22) Filed: Apr. 24, 2006

(65) Prior Publication Data

US 2007/0247769 A1    Oct. 25, 2007

(51) Int. Cl.
*H02H 9/08* (2006.01)
*H01H 75/00* (2006.01)

(52) U.S. Cl. ............................................. 361/42; 335/6
(58) Field of Classification Search .................... 361/42; 335/6
See application file for complete search history.

(56) References Cited

U.S. PATENT DOCUMENTS

| | | | |
|---|---|---|---|
| 6,697,238 B2 * | 2/2004 | Bonilla et al. | 361/42 |
| 6,952,150 B2 * | 10/2005 | Radosavljevic et al. | 335/18 |
| 7,133,266 B1 | 11/2006 | Finlay | |
| 7,164,564 B1 | 1/2007 | Finlay, Sr. et al. | |
| 7,212,386 B1 | 5/2007 | Finlay, Sr. et al. | |
| 2007/0030607 A1 * | 2/2007 | Liscinsky, III | 361/42 |

* cited by examiner

*Primary Examiner*—Michael J Sherry
*Assistant Examiner*—Lucy Thomas
(74) *Attorney, Agent, or Firm*—Chen Yoshimura LLP

(57) ABSTRACT

A receptacle type GFCI includes an input circuit, a leakage current detecting and amplifying circuit, a neutral ground fault detecting and amplifying circuit, a signal control circuit including an IC and a reset and trip actuating circuit, an output circuit, and a ground fault self detecting circuit connected between the input circuit and the reset and trip actuating circuit. The ground fault self detecting circuit is used to test, when the power is turned on for the first time under correct wiring or when the TEST button is pressed after the RESET button is pressed, whether the ground fault protection function of the GFCI is working properly. The ground fault self detecting circuit includes an end-of-life indicator.

2 Claims, 2 Drawing Sheets

RECEPTACLE TYPE GROUND-FAULT CIRCUIT INTERRUPTER

BACKGROUND OF THE INVENTION

1. Field of the Invention

This invention relates to a receptacle type ground fault circuit interrupter (GFCI) device, and in particular, the type of GFCI device using an electromagnetic tripper.

2. Description of the Related Art

GFCI is widely used at present because it can prevent electrical shock to a user to a certain extent and effectively prevent damage to the equipment and fire accidents caused by a ground fault.

The existing receptacle type GFCI includes an input circuit, a leakage current detecting and amplifying circuit, a neutral ground fault detecting and amplifying circuit, a signal control circuit and an output circuit. The power signal goes to the signal control circuit via the input circuit and the rectifying circuit A; a leak detecting signal is produced in the leak fault detecting and amplifying circuit and then input to the signal control circuit; and a ground fault detecting signal is produced in the neutral ground fault detecting and amplifying circuit and then input to the signal control circuit. The signal control circuit outputs the signals, after processing them, to the output circuit.

The rectifying circuit of the input circuit consists of four rectifying diodes D1, D2, D3 and D4 and changes an alternating current into a direct current. The connections between D1 and D2 and between D3 and D4 are connected to the AC input and form the input end of the GFCI. The connection between D2 and D3 forms the load end of the DC power, which will be called "the cathode of the input circuit" thereafter, and the one between D1 and D4 "the anode of the input circuit".

Under a normal working condition, electric current is output from both the receptacle outlet and the load terminal of the GFCI, and the GFCI is in the reset state.

The detecting coils in the leak fault and neutral ground fault detecting and amplifying circuits are used to detect the leak or ground fault signals and, once a leak or ground fault signal detected, will send it to the signal control circuit for processing. The IC in the signal control circuit will then check if the signal is potentially dangerous to people or is harmful to the equipments and, if so, quickly produces a signal to activate the one-way silicon controlled rectifier (SCR1), thus causing the transistor Q1 and the working coil J1 to stop. The elastic dynamic contacts K1, K2, K3 and K4 of the circuit interrupter break, and the circuit interrupter is thus put in the tripped state.

The existing GFCI can be connected to a load through the outlets on the faceplate and the load wiring screws. If such a GFCI is out of its proper working condition for an unknown reason, since its lack of self indicating capability for a fault existing in its system, users may keep using it when the power is turned on at the power input end, which may cause an electric shock.

SUMMARY OF THE INVENTION

An object of this invention is to provide a receptacle type GFCI using an electromagnetic tripper and with a ground fault self detecting function.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a receptacle type ground fault circuit interrupter device, which includes: hot and neutral input lines; hot and neutral output lines; an input circuit connected to the hot and neutral input lines and having an anode and a cathode; a leakage current detecting and amplifying circuit connected to the hot and neutral input lines; a neutral ground fault detecting and amplifying circuit connected to the hot and neutral input lines; a signal control circuit including an IC and a reset and trip actuating circuit, the IC being coupled to the leakage current detecting and amplifying circuit and the neutral ground fault detecting and amplifying circuit; an output circuit connected to the reset and trip actuating circuit; and a ground fault self detecting circuit connected between the input circuit and the reset and trip actuating circuit.

The ground fault self detecting circuit preferably includes: an end-of-life indicator; an NPN transistor having a base connected between the anode of the input circuit and the reset and trip actuating circuit and an emitter connected to the reset and trip actuating circuit and to the end-of-life indicator; a first light emitting diode for connecting to the power supply; a branch circuit including a capacitor and a resistor forming a parallel circuit and a photosensitive resistor coupled in series with the parallel circuit, the photosensitive resistor being optically coupled to the first light emitting diode, one end of the branch circuit being connected between the anode of the input circuit and the reset and trip actuating circuit and another end of the branch circuit being connected to the cathode of the input circuit; a test button; a reset button; a normally closed switch controlled by both the test button and the reset button, the normally closed switch having a first end connected to end-of-life indicator and a second end connected to the first light emitting diode; and a one-way silicon controlled rectifier having an anode connected to the base of the NPN transistor and a control end connected to a connection point between the photosensitive resistor and the parallel circuit of the branch circuit.

The receptacle type ground fault circuit interrupter device preferably further includes a third light emitting diode connected between the hot and neutral output lines.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
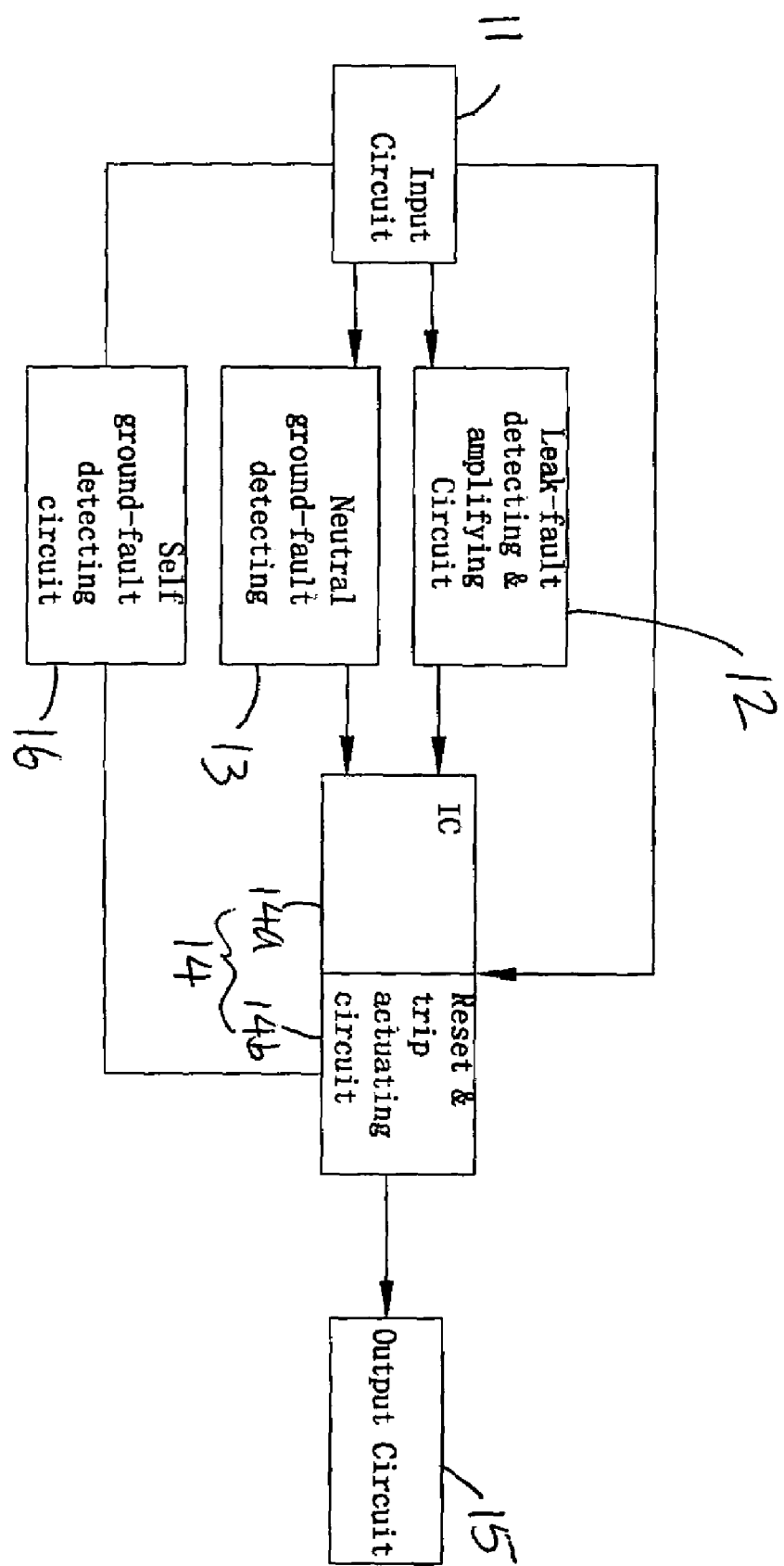
FIG. 1 is a block diagram of a circuit of an embodiment of the present invention.

As shown in FIG. 1, the receptacle type GFCI according to an embodiment of this invention includes an input circuit 11, a leakage current (leak fault) detecting and amplifying circuit 12, a neutral ground fault detecting and amplifying circuit 13, a signal control circuit 14 comprised of an IC 14a and a reset and trip actuating circuit 14b, an output circuit 15, and a ground fault self detecting circuit 16 connected between the input circuit 11 and the reset and trip actuating circuit 14*b*.

Figure 2:
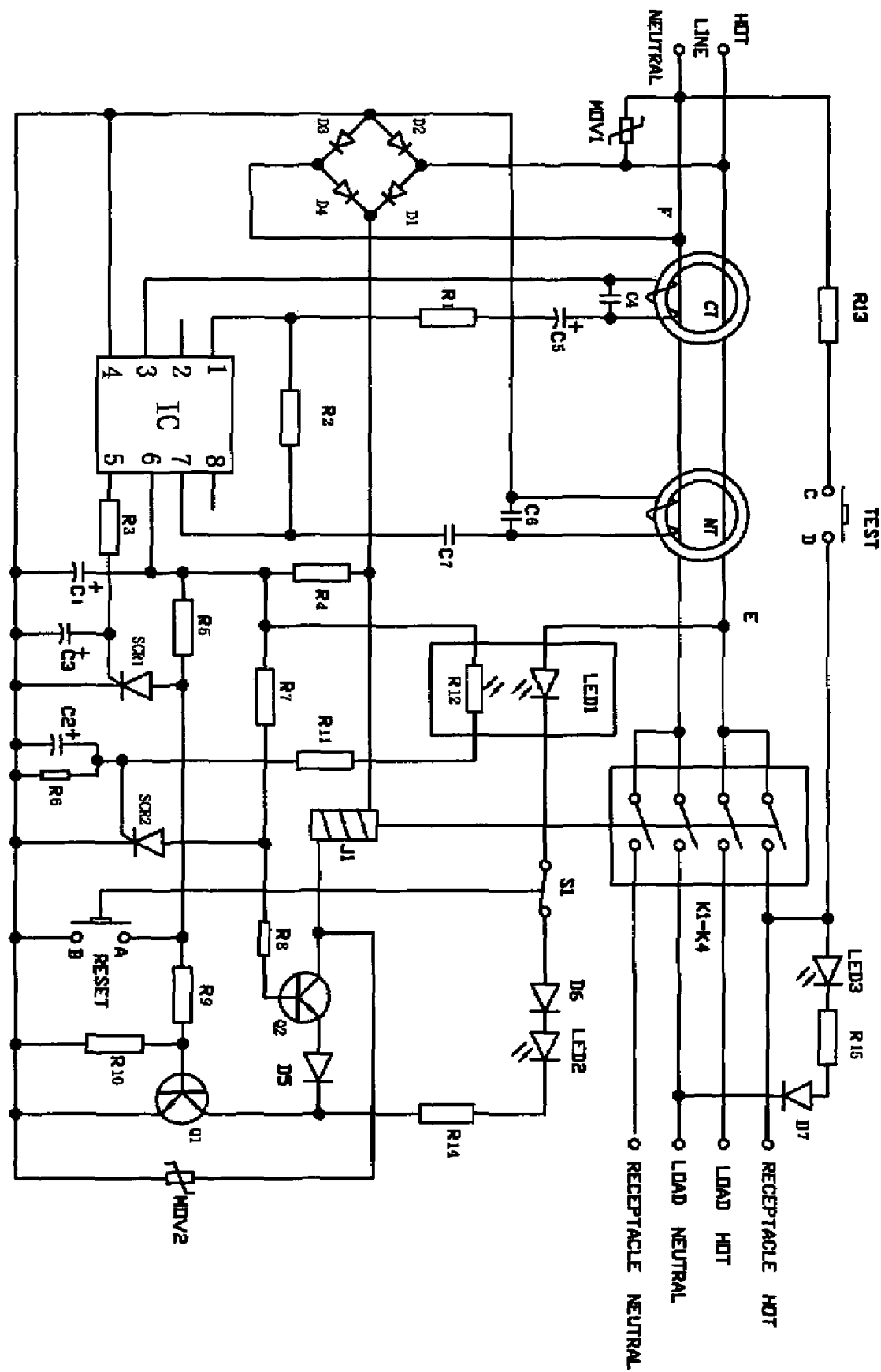
FIG. 2 is a circuit diagram illustrating an embodiment of this invention.

As shown in FIG. 2, the input circuit 11 includes a rectifying circuit formed by four rectifying diodes D1, D2, D3 and D4. The leakage current detecting and amplifying circuit 12 and the neutral ground fault detecting and amplifying circuit 13 include detecting coils CT and NT to detect the leak and the ground fault signals, respectively. The reset and trip actuating circuit 14*b* includes a silicon controlled rectifier SCR1, a transistor Q1, a coil J1 and an offset circuit. The ground fault self detecting circuit 16 includes an end-of-life indicator LED2, a NPN transistor Q2, a light emitting diode LED1, a photosensitive resistor R12, a normally closed switch S1 controlled by both the TEST and the RESET buttons, an one-way silicon controlled rectifier SCR2, a capacitor C2 and a resistor R6. The base of transistor Q2 is connected between the anode of the input circuit (the node between D1 and D4) and the coil J1 of the reset and trip actuating circuit 14*b* via a resistor and connected to the anode of SCR2. The emitter of transistor Q2 is connected to the collector of the NPN transistor Q1 of the reset and trip actuating circuit 14*b* via a diode D5 and connected to the cathode of LED2 via the diode D5. The anode of LED2 is connected to one end of switch S1; the other end of S1 is connected to the cathode of LED 1. The anode of LED1 is connected to the anode (hot wire) of the power supply. The photosensitive resistor R12 is optically coupled to the LED1. One end of a branch circuit that includes the photosensitive resistor R12 is connected between the anode of the input circuit (the node between D1 and D4) and the coil J1, and the other end of this branch circuit is connected to the cathode of the input circuit (the node between D2 and D3). The branch circuit is formed by R12 in series with the parallel circuit of C2 and R6. The control electrode of SCR2 is connected at the connection point between R12 and the parallel circuit of C2 and R6. R6 gives the polar capacitor C2 a longer charging time than the response time of the ground fault function of the GFCI.

The ground fault self detecting circuit 16 is used to test, when the power is turned on for the first time under correct wiring or when the TEST button is pressed after the RESET button is pressed, whether the ground fault protection function of the GFCI is working properly.

To better indicate the electrifying state on the load end of the GFCI, a branch circuit including a light emitting diode LED3 can be positioned parallel with the load (i.e. connected between a hot line and a neutral line) of the GFCI in an embodiment of this invention.

When the power is turned on for the first time under correct wiring, the transistor Q1 conducts, and the electromagnetic coil J1 works to close switches K1, K2, K3 and K4. There is electric current output from the output circuit of the receptacle GFCI, e.g. electric current output from both the output terminal (LOAD HOT and LOAD NEUTRAL) and the receptacle outlet (RECEPTACLE HOT and RECEPTACLE NEUTRAL). The light emitting diode LED3 emits light, indicating that there is electric current on the load end. Meanwhile, the ground fault self detecting circuit 16 of the receptacle GFCI starts to test the ground fault protection function of the GFCI by employing the ground fault simulating loop formed by point E-LED1-S1-Q1-D3-point F. Switch S1 is normally closed and the photosensitive resistor R12 is conducting due to the light emitted by the light emitting diode LED1.

In the case this function is tested to be working properly, SCR1 of the receptacle GFCI starts working while the ground fault simulating loop is conducting, which sets the base potential of the transistor Q1 to zero. When Q1 stops, the ground fault simulating loop is cut off, and LED1 goes out. Consequently, switches K1, K2, K3 and K4 are open, and the receptacle GFCI remains in the tripped state. As the transistor Q1 stops, the transistor Q2 is not in a conductive loop and hence stops too. The photosensitive resistor R12 stops working due to the going out of LED1. The circuit starts to charge the polar capacitor C2. Since the charging time is longer than the time required for the ground fault of the GFCI to take effect, the potential on the control end of silicon controlled rectifier SCR2 is thus lower than the threshold value for it to work. SCR2 does not work because the simulating ground fault loop formed by point E-LED1-S1-Q1-point F makes the GFCI break the circuit off before SCR2 even becomes conducted. Pressing the RESET button at this time resets the GFCI, as the normally closed switch S1 opens to cut off the simulating ground fault loop, and the GFCI is reset to its normal working condition.

In the case the above function tested not to be working properly, which means there is no triggering signal output from the No. 5 pin of IC to the triggering end of the SCR1, SCR1 is not activated. The transistor Q1 and the ground fault simulating loop are conducted all the time, so as to cause the polar capacitor C2 to be charged for a long enough period, which consequently causes the silicon controlled rectifier SCR2 to conduct. This in turn causes the transistor Q2 to stop and the coil J1 to trip. As a result the switches K1, K2, K3 and K4 are open so that the load end of the receptacle GFCI is powered off. The light emitting diode LED3 goes out to indicate that there is no power on the load end to ensure safety. In the meantime, the end-of-life indicator LED2 is always lit, indicating that the ground fault protection function of the GFCI is not working properly the receptacle should no longer be used.

Under correct wiring conditions, pressing the RESET button closes the RESET switch to connect points A and B, and at the same time opening the normally closed switch S1, which causes the silicon controlled rectifier SCR1 to stop working. The RESET switch then disconnects point A and B, so SCR1 remains not working while Q1 starts working. Pressing the TEST button at this time closes the TEST switch to connect points C and D and closes the switch S1. The ground fault simulating loop formed by connecting points C and D starts to detect the ground fault of the GFCI. Meanwhile, another ground fault simulating loop formed by point E-LED1-S1-Q1-D3-point F also starts to detect the same in a similar way as described above.

Because the GFCI device described above has a ground fault self indicating function and an ability to cut off output power on the load end when a fault is detected, it can effectively prevent electric shocks to the users and provide more safety and convenience.

It will be apparent to those skilled in the art that various modification and variations can be made in the receptacle type ground-fault circuit interrupter device of the present invention without departing from the spirit or scope of the invention. Thus, it is intended that the present invention cover modifications and variations that come within the scope of the appended claims and their equivalents.

What is claimed is:

1. A receptacle type ground fault circuit interrupter device, comprising:
   hot and neutral input lines;
   hot and neutral output lines;
   an input circuit connected to the hot and neutral input lines and having an anode and a cathode;
   a leakage current detecting and amplifying circuit connected to the hot and neutral input lines;

a neutral ground fault detecting and amplifying circuit connected to the hot and neutral input lines;

a signal control circuit including an IC and a reset and trip actuating circuit, the IC being coupled to the leakage current detecting and amplifying circuit and the neutral ground fault detecting and amplifying circuit;

an output circuit connected to the reset and trip actuating circuit; and a ground fault self detecting circuit connected between the input circuit and the reset and trip actuating circuit, wherein the ground fault self detecting circuit includes:

an end-of-life indicator;

an NPN transistor having a base connected to the anode of the input circuit and the reset and trip actuating circuit and an emitter connected to the reset and trip actuating circuit and to the end-of life indicator;

a first light emitting diode for connecting to a power supply;

a branch circuit including a capacitor and a resistor forming a parallel circuit and a photosensitive resistor coupled in series with the parallel circuit, the photosensitive resistor being optically coupled to the first light emitting diode, one end of the branch circuit being connected between the anode of the input circuit and the reset and trip actuating circuit and another end of the branch circuit being connected to the cathode of the input circuit;

a test button;

a reset button;

a normally closed switch controlled by both the test button and the reset button, the normally closed switch being connected in series with the end-of-life indicator and connected in series with the first light emitting diode; and a one-way silicon controlled rectifier having an anode connected to the base of the NPN transistor and a control end connected to a connection point between the photosensitive resistor and the parallel circuit of the branch circuit.

2. The receptacle type ground fault circuit interrupter device of claim 1, further comprising a second light emitting diode connected between the hot and neutral output lines.

* * * * *